May 21, 1946.   A. P. FOX ET AL   2,400,817
LUBRICANT-RECEIVING FITTING
Filed Dec. 17, 1942

Alexander P. Fox,
Lutwin C. Rotter,
Victor G. Klein,
Inventors.
Haynes and Koenig
Attorneys.

Patented May 21, 1946

2,400,817

UNITED STATES PATENT OFFICE 2,400,817

LUBRICANT-RECEIVING FITTING

Alexander P. Fox, University City, Lutwin C. Rotter, Maplewood, and Victor G. Klein, St. Louis, Mo., assignors to Lincoln Engineering Company, St. Louis, Mo., a corporation of Missouri Application December 17, 1942, Serial No. 469,366

1 Claim. (Cl. 184—105)

This invention relates to fittings, and with regard to certain more specific features, to lubricant-receiving fittings.

Among the several objects of the invention may be noted the provision of a compact lubricant-receiving fitting of very strong and reliable construction; the provision of a fitting of the class described which is free-flowing, transferring large volumes quickly; and the provision of a fitting of the class described which will effectively cooperate with jaw couplers heretofore used upon the lighter and smaller fittings ordinarily used in lubricating practice, and which will also receive push-type couplers. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claim.

Figure 1:
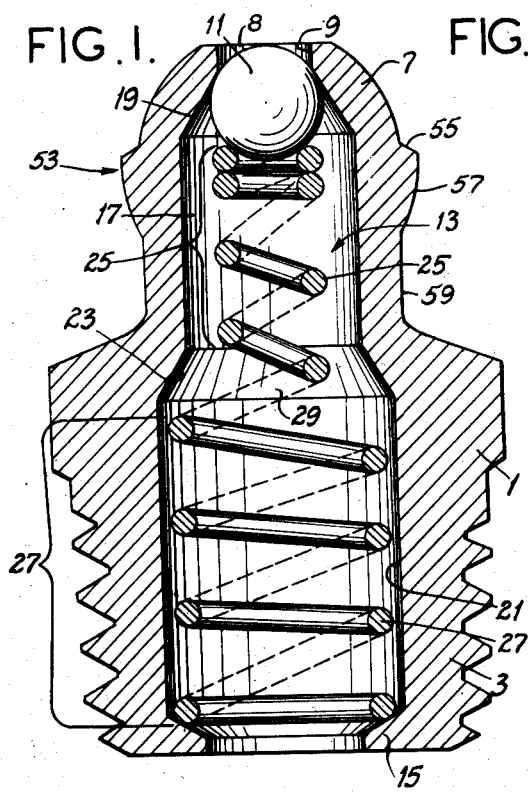
Figure 2:
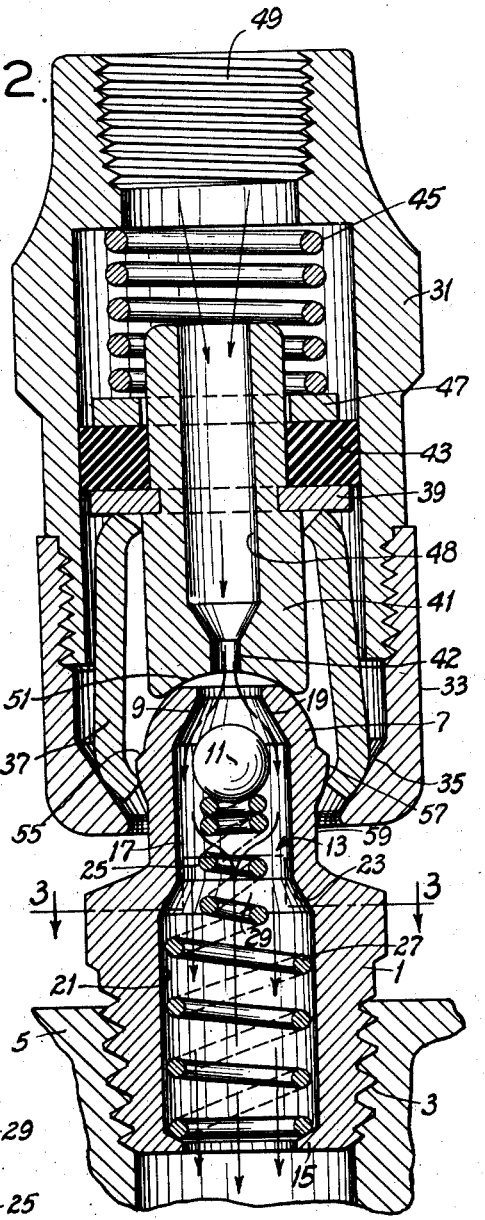
Figure 3:
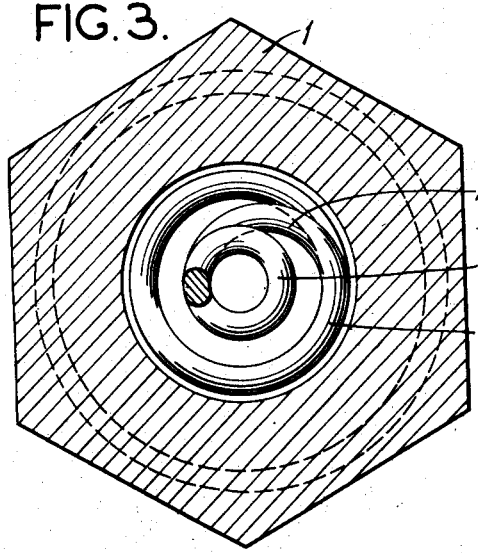

In the accompanying drawing, in which is illustrated one of various possible embodiments of the invention, Fig. 1 is an enlarged vertical section showing our new fitting closed;

Fig. 2 is a view similar to Fig. 1 but on a smaller scale (yet still enlarged with respect to the actual device) and showing the fitting open under application of a standard hydraulic jaw coupler; and, Fig. 3 is a horizontal section taken on line 3—3 of Fig. 2, but enlarged to the scale of Fig. 1.

Similar reference characters indicate corresponding parts throughout the several views of the drawing.

Before our invention, there were lubricant-receiving fittings with coupler-receiving heads in which were lubricant-receiving openings. Behind these heads were various forms of undercut portions or grooves. The grooves were for engagement by the jaws of jaw couplers, also to provide rocking space for guide flanges on push couplers, and for various other purposes, but their general effect was a tendency to weaken the fitting. In order to avoid this weakening effect, it was necessary in general to maintain a small diameter at the lubricant-receiving opening of the fitting. This left enough material between the opening and the groove to provide for the desired strength, but it also necessarily cut down the volumetric flow capacity. In addition, these prior fittings had various seating arrangements for their valves which tended to cause restrictions and reduction in capacity.

For military, agricultural and analogous purposes, the demand is for a strong and rugged but compact fitting which nevertheless has a large volumetric capacity. An additional requirement is that of interchangeable use with the couplings that apply to the prior fittings above discussed. The present invention provides the desired compact, stronger fitting with greater volumetric capacity and free-flowing characteristics, and interchangeability with couplings that fit the older, weaker, low-capacity fittings.

Referring now more particularly to Fig. 1, there is shown at numeral 1 a hexagonal body portion, the lower end of which is threaded as at 3 for attachment to any desired lubricant-receiving object 5, such as indicated in Fig. 2.

At 7 is shown a substantially hemispherical head of a flat truncated form 8 at the top. This is substantially the same as that of said prior fittings with which interchangeability of couplers is desired. The radius of curvature is, for example, .125 inch. This head has an inlet opening 9 which is substantially larger than that heretofore used ($\frac{5}{32}$ inch in diameter, for example). This opening 9 is closed by a ball-check valve 11 held in place by a spring 13 of a special new form. The upper end of the spring reacts against the ball 11 and its lower end against an inner shoulder 15. The opening 9 is quite short, to the extent that the ball 11, when seated on an inner seat 19, extends substantially into tangential relationship with the outer end of the opening. This places the ball about tangent to the flat end of the truncated hemisphere 7.

The spring 13 is located in the lubricating-receiving passage which consists of a portion 17 about $\frac{11}{64}$ inch in diameter, connected with the inlet opening 9 by means of the tapered seat portion 19.

Below the passage 17 is a still larger passage 21 of about $\frac{15}{64}$ inch in diameter, which is connected with passage 17 by means of a tapered portion 23.

The spring 13 has an upper section 25 upon which the ball 11 is supported. This section 25 is of small diameter, as shown, so that this section acts practically as a rigid column instead of as a spring. It is connected with a lower section 27 of diameter large enough to compress as a spring. The two sections 25 and 27 are connected by a continuous spiral part 29. Since the entire spring 13 is made of a continuous piece of spring wire of the same diameter throughout, it follows that most, if not all, of the resilience of the spring is in the large-diametered portion 27 while the upper portion 25 acts as a relatively stiff column. Therefore, there is very little closing action between coils of the part 25 (in bore 17), which causes minimum interference with lubricant flow. Even if the coils in the portion 27 should approach one another closely, as under a high-volume flow, this flow is not interfered with much, because it may freely enter and pass through the open center portion of spring section 27. Furthermore, neither portion 25 nor the intermediate spiral part 29 substantially interferes with the flow of lubricant into the portion 27. The closed conditions are shown in Fig. 1 and certain open conditions in Fig. 2.

The arrows suggest the unobstructed flow.

In Fig. 2 is shown a standard, so-called hydraulic coupler, consisting of a body 31 to which is threaded a member 33 having an internal conical cam or wedge 35. This cam 35 is engaged by the ends of a plurality of jaws 37 (preferably three). The upper ends of these jaws are engaged by a flange 39 extending from an axially movable nozzle 41. A packing 43 is carried on the flange 39 and seals the space between the body 31 and the nozzle 41. A spring 45 resting upon a washer 47 downwardly biases the packing 43 along with the nozzle 41, thus biasing the jaws 37 against the conical cam 35. As shown, the nozzle 41 has an opening 48 therethrough which is in communication with the threaded inlet 49 of the body 31. It will be understood that this threaded inlet 49 is attached to a suitable lubricant line adapted to be put under pressure.

Since interchangeability is desired with couplers that fit the prior fittings above described, the various dimensional relationships of the coupler may remain what they were and are so shown. For example, the size of cam 35 and of the jaws 37 remains the same. So also does the curvature of the concave contact area 51 of the nozzle 41, which is about .130 inch. The outlet 42 also remains what it was. It is to be understood however that if desired other coupler dimensions may be employed as, for example, one with a larger outlet 42. Also, so-called push type couplers may be used in which a needle nozzle of suitable size enters the opening 9 for edge contact therewith (see, for example U. S. Patent 2,060,456, showing such a push type of coupler).

Heretofore under pressure the packing 43 moved the jaws into contact with the cam 35. The jaws 37 moved axially and were forced inwardly into the grooves of the prior fittings whenever lubricant pressure was admitted into the opening 49. This gripped the coupling to the fitting head, while admitting lubricant through the passage 42 to the fitting.

In the present fitting the old weakening groove is eliminated, but the desirable hemispherical nose 7 is retained. Contrary to the grooves, we use below the outwardly presented hemisphere 7 an inverted partial sphere forming a bulge or collar shown in general at numeral 53, which strengthens rather than weakens the fitting. This partial sphere 53 has the same center as the hemisphere 7 and has a radius of the order of about .140 inch. The upper surface of this bulge or collar 53 is downwardly chamfered as a guide and spreader as shown at 55. Thus beneath this chamfer is the inverted spherical region 57 which merges into the neck 59 at a diameter near that of the base of hemisphere 7. Interchangeability with the old form of nozzle 41 shown is obtained by maintaining the old hemispherical size and shape at 7. The bulge 53 formed by the chamfer 55 and inverted partially spherical portion 57, upon application of the coupler as shown in Fig. 2, simply pushes the jaws 37 out further than did the older fitting; but not far enough to bind in the member 33. After the attachment and application of pressure to the coupler, the jaws wedge in on the inverted partially spherical surface 35 below the chamfer 55. Gripping is accomplished on the under side of the spherical portion 57.

As shown in the drawing, it is preferable that the center of the spherical portion 7 be the same as that of the portion 57, and permit maximum ease of rocking of the coupler on the fitting, a desirable feature from the viewpoint of reduced scuffing.

It will be seen that the neck 59 is quite thick and short, having an outside diameter (15/64 inch) which is of the order of the base diameter of the spherical end 7 and also of the order of the large bore 21. The portions between the neck 59 and the bottom of the spherical portion 7 are not weakened by any grooves or the like, but on the contrary are definitely strengthened by the bulge 57. All of this permits the safe use of a larger opening 17 and thus freer flow.

From the above it will be seen that rather than having a jaw-gripping portion, such as a groove, which weakens the fitting, we have provided a special jaw-gripping portion which not only strengthens the fitting and provides for a much heavier neck 59 through which a much larger passage for lubricant is possible, but maximum ease of coupler rocking is obtained.

The dimensions above given are not to be taken as limiting but illustrative of relationships of form which are believed to be new, such as for example the substantial equality between the outside diameter of the neck 59 and the base diameter of the outwardly presented hemisphere 7, and the enlargement provided by the inverted partial sphere 57 being constructed on the same center as said hemisphere 7. This combination of features brings about a stronger construction which is not brought about at the expense of lubricant transmission capacity, or of interchangeability.

The fact that the chamfered seat 19 is spaced from the flat end 8 of the hemisphere 7 by the short opening 9 has several important effects. First, it allows the stated approximate tangency between the ball 11 and the truncation 8. Hence when a fitting is wiped preparatory to attaching a coupler very little foreign material remains within passage 9 which would otherwise be forced through the fitting, as for example in prior types of fittings with long inlets above their valves wherein irremovable dirt becomes embedded. Second, the ball 11, as a valve, is thus readily exposed to view and gives information as to whether it is seating properly. Third, this places the chamfer 19 roughly parallel to the outer hemisphere 7 and provides a roughly constant wall thickness from the hexagon 1 to the end of the fitting, except for the slight additional thickness at the spherical shoulder 57. This results in maximum tube strength against breakage by the coupler, with maximum flow opening, but with a maximum amount of material in the tube which might otherwise make it unfeasible to have the fitting fit within standard couplers.

It should be noted that a substantially constant wall thickness is preserved in the fitting above its main body portion. That is to say, the spherical end portion 7 at its base is no larger in diameter than the cylindric neck 59. Furthermore, the inverted spherical bulge portion 57, while having no part smaller in diameter than the cylindric neck 59, still has its largest diameter small enough to add less to the radius of the neck cylinder than its desired wall thickness.

In view of the above, it will be seen that the several objects of the invention are achieved and other advantageous results attained.

As many changes could be made in the above constructions without departing from the scope of the invention, it is intended that all matter contained in the above description or shown in the accompanying drawing shall be interpreted as illustrative and not in a limiting sense.

We claim:

A lubricant-receiving fitting comprising a main body portion for attachment purposes, an undiminished cylinder extending from said body portion having an opening therethrough, a truncated spherical portion terminating said cylinder and having an inlet through its truncation, said spherical portion having at its base its maximum diameter which is substantially the same diameter as that of the cylinder, a chamfered inside seat in the spherical portion and connecting said inlet with said opening, the length of said inlet and the angle of said chamfered seat being such that the said seat is located within the spherical portion in such a position that the chamfer of the seat becomes approximately spaced from the surface of the spherical portion at a wall thickness in the spherical portion approximating the wall thickness in the cylinder determined by the opening therethrough, an inverted spherical bulging portion around the cylinder at the base of the first-named spherical portion, the radius of curvature of the inverted bulged spherical portion being larger than that of the other spherical portion, the base of said inverted spherical portion being no smaller in diameter than said cylinder, and a chamfered step between said spherical portions, the difference between the radii of said spherical portions being less than said wall thickness.

ALEXANDER P. FOX.
LUTWIN C. ROTTER.
VICTOR G. KLEIN.